United States Patent [19]

Neefe

[11] 4,110,264

[45] Aug. 29, 1978

[54] PERMEABLE POLYMETHYLMETHACRYLATE CONTACT LENS

[76] Inventor: Charles W. Neefe, P. O. Box 429, Big Spring, Tex. 79720

[21] Appl. No.: 849,764

[22] Filed: Nov. 9, 1977

Related U.S. Application Data

[63] Continuation-in-part of Ser. No. 737,045, Oct. 29, 1976, abandoned, which is a continuation-in-part of Ser. No. 663,095, Mar. 2, 1976, abandoned, which is a continuation-in-part of Ser. No. 579,796, May 22, 1976, Pat. No. 3,957,049, which is a continuation-in-part of Ser. No. 404,352, Oct. 9, 1973, abandoned, which is a continuation-in-part of Ser. No. 233,408, Mar. 10, 1972, Pat. No. 3,786,812, which is a continuation-in-part of Ser. No. 562,022, May 16, 1966, abandoned.

[51] Int. Cl.² .............................................. C08J 9/26
[52] U.S. Cl. ................................ 521/63; 260/33.4 R; 351/160; 526/312; 526/328; 521/149
[58] Field of Search ........... 260/2.5 M, 2.5 R, 33.4 R; 526/328, 312; 351/160

[56] References Cited

U.S. PATENT DOCUMENTS

| 3,275,548 | 9/1966 | Walters | 260/2.5 M |
| 3,607,793 | 9/1971 | Mahlman | 260/2.5 M |
| 3,879,515 | 4/1975 | Morita | 260/2.5 M |

OTHER PUBLICATIONS

Condensed Chemical-Dict., 8th Ed., p. 14.

*Primary Examiner*—Morton Foelak

[57] ABSTRACT

A gas permeable contact lens concave-convex in form made of a transparent, optically clear polymethylmethacrylate.

5 Claims, 2 Drawing Figures

PERMEABLE POLYMETHYLMETHACRYLATE CONTACT LENS

RELATED APPLICATIONS

This is a continuation-in-part of application Ser. No. 737,045 filed Oct. 29, 1976 entitled A PERMEABLE POLYMETHYLMETHACRYLATE now abandoned which is a continuation-in-part of Ser. No. 663,095, filed Mar. 2, 1976, entitled A OXYGEN PERMEABLE CONTACT LENS now abandoned which is a continuation-in-part of application Ser. No. 579,796, filed May 22, 1976, entitled A RECHARGEABLE DRUG DELIVERY METHOD now U.S. Pat. No. 3,957,049, which is a continuation-in-part of application Ser. No. 404,352, filed Oct. 9, 1973 entitled DRUG DELIVERY METHOD now abandoned, which is a continuation-in-part of Ser. No. 233,408, now U.S. Pat. No. 3,786,812, filed Mar. 10, 1972 entitled CONTACT LENS FOR OCULAR DRUG DELIVERY which is a continuation-in-part of Ser. No. 562,022, filed May 16, 1966, now abandoned.

THE PRIOR ART

Contact lenses that are being used at this time depend upon the flow of lachrymal fluids around the edge of the lens to supply the cornea with it's necessary oxygen. The cornea tissue maintains a temperature much lower than the other body tissues. This is due to evaporation at the corneal surface, and the lack of blood supply to the cornea which warms the rest of the body. The temperature of the cornea must be at this lower level or its metabolic processes will be accelerated. The plastic now being used for fabricating contact lenses is a very poor conductor of heat. This insulating material covering a large percent of the corneal area raises its temperature which increases the chemical activity of the metabolic processes and the cornea demands more oxygen to maintain normal metabolism. The present lenses prelude the free exchange of atmospheric oxygen dissolved in the precorneal fluid from reaching the corneal tissue. The result is edema and epithelium disorganization.

Lenses have been made with small holes drilled through the lens is an effort to overcome this problem. If the holes are large, they will be seen by the wearer, and if small enough not to be seen, they become clogged with body secretions and are rendered useless.

SUMMARY OF THE INVENTION

According to the invention, a contact lens is provided which is made of a transparent permeable material which will provide gaseous exchange of both oxygen and carbon dioxide, through the transparent permeable lens, to the outer surface of lens in contact with the atmosphere. It is preferred that at least a portion of the lens have a thickness of no greater than one-thousandth of an inch to thereby provide maximum gaseous exchange through the transparent permeable lens.

The new and greatly improved contact lens material of this invention overcomes these disadvantages by allowing the lachrymal fluids to enter the material from which the lens is made. Lachrymal fluids and dissolved gasses can pass through the lens by diffusion. This Exchange is slow, but it must be remembered that the metabolic processes of the corneas are slow and this new improved lens is a better conductor of heat. Excess fluid content within the corneal tissue must be avoided in order to maintain a transparent cornea.

Present corneal contact lenses must be fitted with the peripheral zone flatter than the cornea in order to provide lachrymal flow and oxygen to the apex of the cornea. This clearance created around the edge allows the lens to move about the cornea and may be forced off center by the action of the upper lid, also lid sensation and discomfort result from edge stand off. With the present corneal contact lenses, no fixed alignment between the optical center of the contact lens and eye is possible.

This new permeable lens allows the dissolved gases to pass through the lens material; therefore, the lens may be fitted in true contact with the corneal surface from center to edge. The corneal surface is not spherical therefore no movement of the lens will be possible if the lens is in contact with the cornea from center to edge providing improved comfort. This permeable flow differs from passage through holes drilled in the lens in that the atomspheric gases dissolve into the molecular structure of the lens and diffuses into permeates the lens structure.

This new lens design may be employed as a therapeutic device by adding the required medication to the lens material. The medication will be dissolved slowly by the lachrymal fluids and find its way to the corneal tissue by diffusion to the surface of the lens. With this lens, a long-lasting and highly effective medications are now possible.

DESCRIPTION OF THE DRAWINGS

This invention can be more easily understood from a study of the drawings in which.

Figure 1:
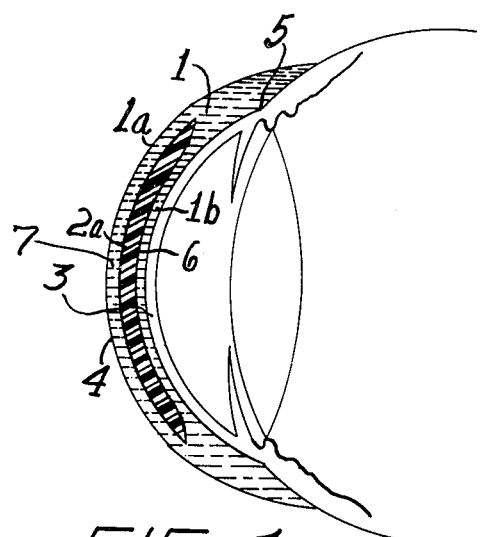
FIG. 1 is a cross sectional view of the gas permeable contact lens of this invention in place on the cornea, having a positive refraction power and being of the size smaller than the cornea.
Figure 2:
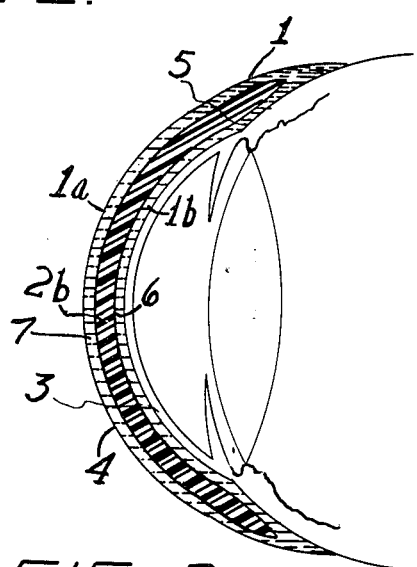
FIG. 2 is a cross sectional view of the gas permeable contact lens of this invention in place on the cornea, and having a positive refraction power and a size larger than the cornea. The larger size makes this lens an excellent post-operative dressing. For this purpose, the thickness may be increased to provide an even pressure to all parts of the cornea.

It is noted that with exception of lenses 2a and 2b, respectively, the various parts and features having similar functions which are shown in FIGS. 1 and 2, are referred to with the same characters. Lenses 2a and 2b illustrate transparent permeable contact lenses having positive refractive powers. Lens 2b differs from lens 2a in that the outer periphery thereof rests on area 5 (FIG. 2) which is outside the limbus. Lens 2b is useful as a post-operative dressing for corneal surgical cases. Lens 2a is a similar transparent permeable lens, except it is thinner at its periphery. In all other respects, the lenses are similar bodies. a concave inner corneal surface 6 is shaped to lie upon and conform to the curvature of the cornea 3. The lachrymal film 1 surrounds the respective lens and covers the surface of the cornea. Film 1a covers anterior surface and is in contact with the atomsphere 4 and film 1b contact posterior surface 6 and the corneal surface.

DESCRIPTION OF THE PREFERRED EMBODIMENT

The oxygen consumption rate of the human cornea is approximated to be 2.8ml/$cm^2$-hr. This value has been determined by Jauregui and Fatt, "Estimation of the Vivo Oxygen Consumption of the Human Cornal Epithelium", in the Americal Journal of Optometry and Archives of American Academy of Optometry, June 1972, page 507.

The herein disclosed material is of polymethylmethacrylate having an open molecular sponge-like structure. The material is firm and ridged having the appearance of and feel of conventional polymethylmethacrylate. The material is made by adding a soluble compound to the methylmethacrylate monomer. The miscible compound must meet three requirements: (1) It must be miscible or soluble in methylmethacrylate monomer. (2) The additive must not enter into the polymeric chain upon polymerization. (3) The additive must be capable of being dissolved and extracted from the polymer leaving the porour sponge like molecular structure.

Several solids and liquids have been found which meet these requirements, examples are: 2-Propanol, Methanol, Butanol, and Ethyl Alcohol which may be used individually or in combination in amounts ranging from 2% to 40% by weight.

The material is prepared as follows which is a typical example of the procedures employed. To inhibator free methyl methacrylate monomer 10% by weight ethyl alcohol is added and 20% by weight of the catalyst 2,2'-Axobis (2-methyl-propionitrile) was added. The mixture was purged of atomspheric oxygen and placed under a nitrogen blanket. The mixture was placed in glass tubes 14m/m in diameter and 160 m/m long. The filled and sealed tubes were placed in a water bath at 55° C for 24 hours.

The material polymerized to form clear rods. The glass tubes were removed and a post cured of 70° C for 12 hours. The rods are turned to 0.50 inch diameter in an atlas lathe. The 0.50 inch rods are cut into 0.25 inch thick discs and made into contact lenses by the methods well known to the art. The finished lens were extracted 24 hours in distilled water at 70° C with continuous agatation to remove the ethyl alcohol. The finished extracted lens were placed on the cornea of the eye.

Various modifications, of course, can be made without departing from the spirit of this invention or the scope of the appended claims. It is understood that many variations are obtainable which will yield materials as disclosed herein. The constants set forth in this disclosure are given as examples and are in no way final or binding.

What is claimed is:

1. A permeable contact lens concave-convex in form of an optically clear material made by the steps of adding to monomeric methylmethacrylate 2% to 40% by weight of a soluble material which does not react with monomeric methyl methacrylate during polymerization, polymerizing the methyl methacrylate solution to form a solid mass and extracting said soluble material from the solid polymethyl methacrylate.

2. A material as in claim 1 wherein the soluble material is ethyl alcohol.

3. A material as in claim 1 wherein the soluble material is methanol.

4. A material as in claim 1 wherein the soluble material is butanol.

5. A material as in claim 1 wherein the soluble material is 2 propanol.

* * * * *